(12) United States Patent
Barkol et al.

(10) Patent No.: US 9,361,401 B2
(45) Date of Patent: Jun. 7, 2016

(54) RELEVANCE MAP LINKING

(71) Applicant: Hewlett-Packard Development Company, L.P., Houston, TX (US)

(72) Inventors: Omer Barkol, Haifa (IL); Shahar Golan, Haifa (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 130 days.

(21) Appl. No.: 13/714,702

(22) Filed: Dec. 14, 2012

(65) Prior Publication Data

US 2014/0172903 A1 Jun. 19, 2014

(51) Int. Cl.
*G06F 17/30* (2006.01)
*G06Q 10/06* (2012.01)

(52) U.S. Cl.
CPC ...... *G06F 17/30943* (2013.01); *G06Q 10/0631* (2013.01)

(58) Field of Classification Search
None
See application file for complete search history.

(56) References Cited

U.S. PATENT DOCUMENTS

| | | | | |
|---|---|---|---|---|
| 8,316,019 B1* | 11/2012 | Ainslie et al. | | 707/733 |
| 8,386,495 B1* | 2/2013 | Sandler et al. | | 707/748 |
| 8,645,394 B1* | 2/2014 | Kolak et al. | | 707/748 |
| 8,819,236 B2* | 8/2014 | Gkantsidis et al. | | 709/226 |
| 2003/0172161 A1* | 9/2003 | Rymon | | 709/226 |
| 2006/0149717 A1* | 7/2006 | Bird et al. | | 707/3 |
| 2006/0271281 A1 | 11/2006 | Ahn et al. | | |
| 2008/0275861 A1* | 11/2008 | Baluja et al. | | 707/5 |
| 2009/0248709 A1* | 10/2009 | Fuhrmann et al. | | 707/100 |
| 2010/0161369 A1* | 6/2010 | Farrell et al. | | 705/8 |
| 2011/0145719 A1 | 6/2011 | Chen et al. | | |
| 2012/0001919 A1 | 1/2012 | Lumer | | |
| 2012/0095863 A1 | 4/2012 | Schiff et al. | | |
| 2013/0036112 A1* | 2/2013 | Poon | | 707/723 |
| 2014/0032552 A1* | 1/2014 | Cohen et al. | | 707/737 |

OTHER PUBLICATIONS

Huang, et al., "A Unified Relevance Model for Opinion Retrieval," The 18th ACM Conference on Information and Knowledge Management, Nov. 2-6, 2009, Hong Kong, China, 10 pages.
Kasravi, et al., "Determination of Expertise Authority," U.S. Appl. No. 13/400,673, filed Feb. 21, 2012, 27 pages.

* cited by examiner

*Primary Examiner* — Robert Beausoliel, Jr.
*Assistant Examiner* — Pedro J Santos
(74) *Attorney, Agent, or Firm* — Brooks, Cameron & Huebsch, PLLC (57) ABSTRACT

Systems, methods, and machine-readable and executable instructions are provided for relevance map linking. Relevance map linking can include identifying a user as a user node that is associated with a number of user resources. Relevance map linking can also include finding a number of related resources that are associated with the number of user resources and defining the number of related resources as a number of related resource nodes. Relevance map linking can include defining a number of related resource relevance maps for the number of related resource nodes. Relevance map linking can include defining a user relevance map for the user node wherein the user relevance map links the number of related resource nodes and the user node based on the number of resource relevance maps.

15 Claims, 6 Drawing Sheets

RELEVANCE MAP LINKING

BACKGROUND

The ability to organize information becomes important as companies grow. Organizing information allows users to locate and utilize the information. Users can be interested in different kinds of information. Users can have different information needs at different times.

DETAILED DESCRIPTION

An enterprise can be associated with a number of users. A number of users can be associated with a number of categories and a number of resources. Organizing of the users, categories, and resources can be important to users seeking information. A relevance map can be used to assist a user in finding information. A relevance map can be created for each user. For example, the relevance map can link the user to categories, resources, and/or other users based on the relevance maps that can be created for each of the categories, the resources, and/or the other users. A number of weights can be assigned to the links. A user can modify the value of the weights to customize his relevance map to suit the needs of the user. A relevance map that has been customized to meet the information needs of a user can allow a user to visualize and access categories, resources, and/or other users, which can increase the availability of information.

Previous approaches to providing access to information for a user include giving a user access to a database of information. However, access to a database does not provide a user with the ability to filter the information that is not relevant to a user. The database of information does not allow the user to determine how relevant the information in the database is to the user.

As used herein, information can include users, categories, and/or resources. In a number of examples, information can include other structures and/or objects.

A relevance map can generate a number of suggestions of information that can be relevant to a user. An initial relevance map can be known as a default relevance map. The user can modify the default relevance map and/or a modified relevance map by identifying users, resources, and/or categories that are relevant to the user. A number of additional users, resources, and/or categories can be identified as relevant to the user based upon the characteristics of the users, resources, and/or categories. The additional users, resources, and/or categories can also be included in the user's relevance map. Creating a number of suggestions of relevant information to the user and allowing the users to modify the relevance map can provide a user with direct access to the relevant information.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
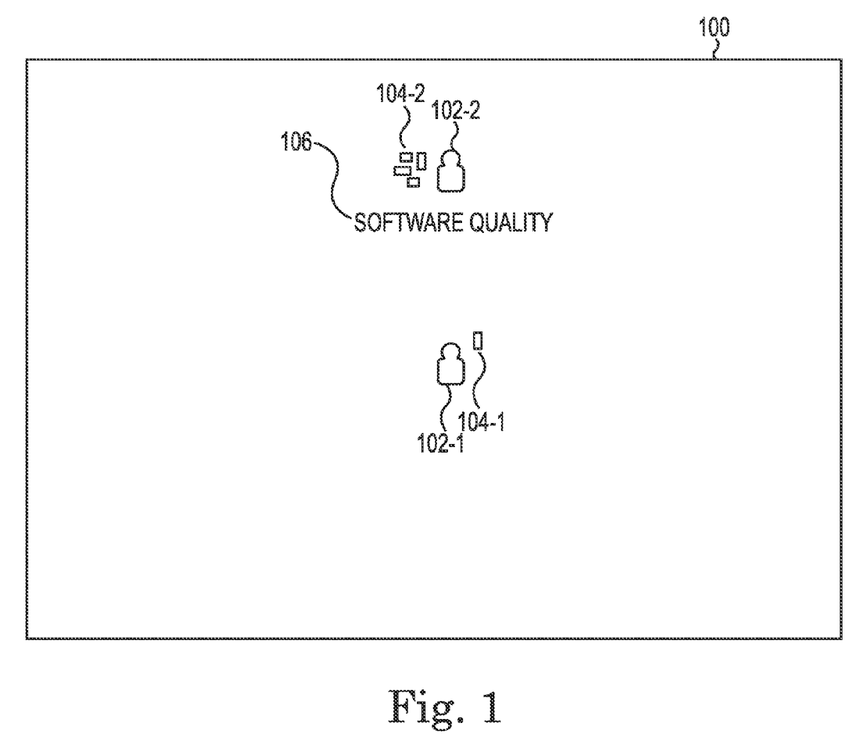
FIG. 1 is a diagram illustrating an example of a relevance map according to the present disclosure.

FIG. 1 is a diagram illustrating an example of a relevance map according to the present disclosure. An illustration of a relevance map 100 can be created for a first user by implementing a number of machine executable instructions.

The first user can be represented as a first user node 102-1 in the relevance map 100. The first user can be associated with a first number of resources. The first number of resources can be represented as a first number of resource nodes 104-1. As used herein, although a user node and a first number of nodes can have different meanings and although a number of resource and a number of resource nodes can have different meanings, a user node can be referred to generally as a user and a number of resource nodes can be referred to generally as resources.

As used herein, a user can be an entity that can be associated with an enterprise. For example, a user can be a person and/or a computing system. An enterprise can be an organization to which a number of users belong. For example, an enterprise can be a corporation that hires a number of users. An enterprise can be a group of users that organize themselves for a particular purpose. An enterprise can also be a group of users that share a number of resources among themselves. For example, an enterprise can include a first user 102-1, e.g., first user node 102-1, a second user 102-2, e.g., second user node, and a number of other users not illustrated in FIG. 1.

First user 102-1 and second user 102-2 can be associated with a number of resources. For example, a first user 102-1 can be associated with a first number of resources 104-1.

A resource can contain information. For example, a resource can be a document that contains information regarding a category, e.g., topic. A resource can be machine-readable instructions (MRI) that can be associated with a number of topics and/or a number of categories. A resource can be a presentation, a database, and/or a template, among other examples of a resource. A user can be associated with a resource when a user creates the resource. A user can create a resource when the user is an author of the resource, e.g., document, for example.

In a number of examples, a number of related resources can be identified and/or found. The number of related resources can be represented in a relevance map 100 as a second number of resource nodes 104-2. Each of the second number of resource nodes 104-2 can have an associated relevance map (not shown). Each of the associated relevance maps can contain a number of links between one of the second number of resource nodes 104-2 and a number of users (not shown) and/or a number of categories (not shown). The relevance maps associated with the second number of resource nodes 104-2 can provide a context that can be used to make a determination whether the second number of nodes 104-2 is associated with a first user 102-1 and/or a first number of resources 104-1.

The second number of resource nodes 104-2, referred to generally as a second number of resources 104-2, can be associated with a second user 102-2. Furthermore, the second number of resources 104-2 can be associated with a category. A category can be represented as a category node 106, e.g., referred to generally as a category 106, in FIG. 1.

The second number of resources 104-2 can be identified by analyzing the first number of resources 104-1. For example, the first number of resources 104-1 can be associated with category 106. That is, the first number of resources 104-1 can be included in the category. A category 106 can include, for example, "Software Quality", among other categories. The second number of resources 104-2 can be selected based on the association that the second number of resources 104-2 have with the category 106. The second number of resources 104-2 and the first number of resources 104-1 can be associated with each other when they are both associated with the same category 106.

The second number of resources 104-2 and the first number of resources 104-1 can be associated with each other when they are both associated with a second user 102-2. For example, a first user 102-1 and a second user 102-2 can be authors of a first number of resources 104-1. The second user 102-2 can also be an author of a second number of resources 104-2. The first number of resources 104-1 and the second number of resources 104-2 can be associated through second user 102-2. In a number of examples, a first number of resources 104-1 and a second number of resources 104-2 can be associated through other ways.

Furthermore, categories, users, and/or resources can be relevant to a user 102-1 when the categories, users, and/or resources are associated with the user 102-1, the first number of resources 104-1, and/or the category 106. For example, a user 102-1 can work under a software quality division in an enterprise. A second user 102-2 can be associated to the first user 102-1 when the second user 102-2 also works in the software quality division of the enterprise. Other examples of associations between the first user 102-1 and other users, categories, and/or resources can be used.

A relevance map can be created for the information that the enterprise has access to. For example, a number of instruction can be implemented to create a relevance map can for a user, a category, and/or a resource, among other forms of information. An association between the first user 102-1 and the second user 102-2 can be evaluated based on a relevance map that is associated with the second user 102-2. An association between the first user 102-1 and the category 106 can also be evaluated based on a relevance map that is associated with category 106.

A link can express relevance between two nodes. A link can be created between the first user 102-1 and the second number of resources 104-2 when the second number of resources 104-2 are relevant to the first user 102-1. The first user 102-1 and the second number of resources 104-2 can be associated through the first number of resources 104-1. A link can be created between the first user node 102-1 and the second user node 102-2 when the second user node 102-2 is relevant to the first user node 102-1. Links in a relevance map 100 can link the user node 102-1 to a different node. In a number of examples, links in a relevance map 100 can link a number of nodes to each other such that the links are not required to include the user node 102-1.

A link can have an associated weight. The value of the weight can identify a strength of a relevance, e.g., correlation, that a second number of resources 104-2, a second user 102-2, and/or a category 106 can have to the first user 102-1. The value of a weight can be based on a comparison between the user 102-1 and the relevance maps of the other nodes in the relevance map 100, e.g., the second number of resources 104-2, the second user 102-2, and/or the category 106. The value of the weight can also be based on a comparison between the relevance map 100 and the relevance maps of the other nodes in the relevance map 100. The value of a weight can be adjusted by the first user 102-1. A user can adjust the value of a weight to indicate that the relevance of a node to the first user 102-1 has changed. A relevance of a node to the first user 102-1 can change, for example, when the first user 102-1 is trying to access information that is not found in the node.

In a number of examples, the state of the relevance map 100 that is associated with the first user 102-1 can be saved. Saving the state of the relevance map 100 can allow a user 102-1 to create a number of states that can aid the user 102-1 in locating resources, categories, and/or other users. The state of the relevance map 100 can be saved as a default state. That is, the relevance map 100 can be an initial state, e.g., default state, from which other states of the relevance map 100 can be loaded. Saving a relevance map 100 allows a first user 102-1 to return to the relevance map 100 when the nodes in relevance map 100 are relevant to the first user 102-1.

The state of the relevance map can be altered when, for example, the first user 102-1 increases the weight of the second number of documents 104-2. A weight can have a value between 0 and 1. A weight with a value of 0 that is assigned to a link between a first node and a second node can represent no relevance of the second node to the first node. A weight with a value of 1 that is assigned to the link between the first node and the second node can represent the a strong relevance of the second node to the first node. For example, the value of the weight can be increased by a user from 0.5 to 0.7 such that a strength of relevance is increased.

The user 102-1 can alter the weight by issuing an edit operation. The edit operation can communicate an action. For example, increasing and/or decreasing the value of a weight can constitute an action. An action can also be an instructions to increase the value of a weight by a specific amount. An action can also be an instruction to decrease the value of a weight by a specific amount. An action can be communicated through a real number between −1.0 and 1.0. That is, an action can be a number that represents a change in a weight that can be implemented. However, an action can be communicated through other means and is not to be limited to a real number between −1.0 and 1.0. An action can, for example, can indicate that the value of the weight can be decreased when the real number that represents the action has a value that is less than 0.0. The action can indicate that the value of the weight can be increased when the real number that is associated with the action has a value that is greater than 0.0. The action can indicate that the value of the weight is to remain unchanged when the real number that is associated with the action has a value equal to 0.0. An action can indicate that a node is more and/or less relevant to a user than previously considered.

Figure 2:
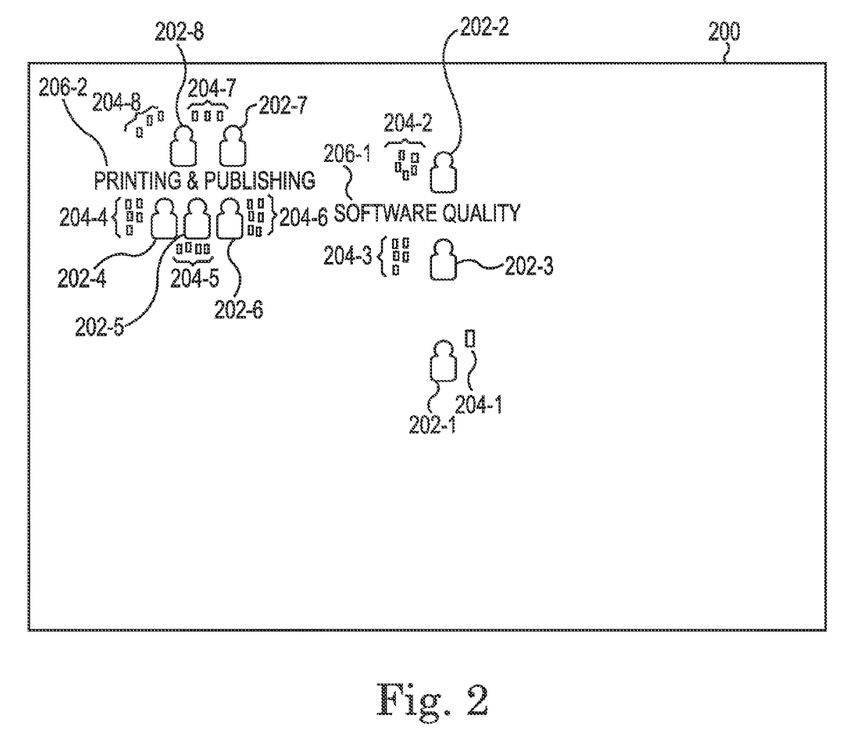
FIG. 2 is a diagram illustrating an example of increasing the value of a weight of a node in a relevance map according to the present disclosure.
Figure 3:
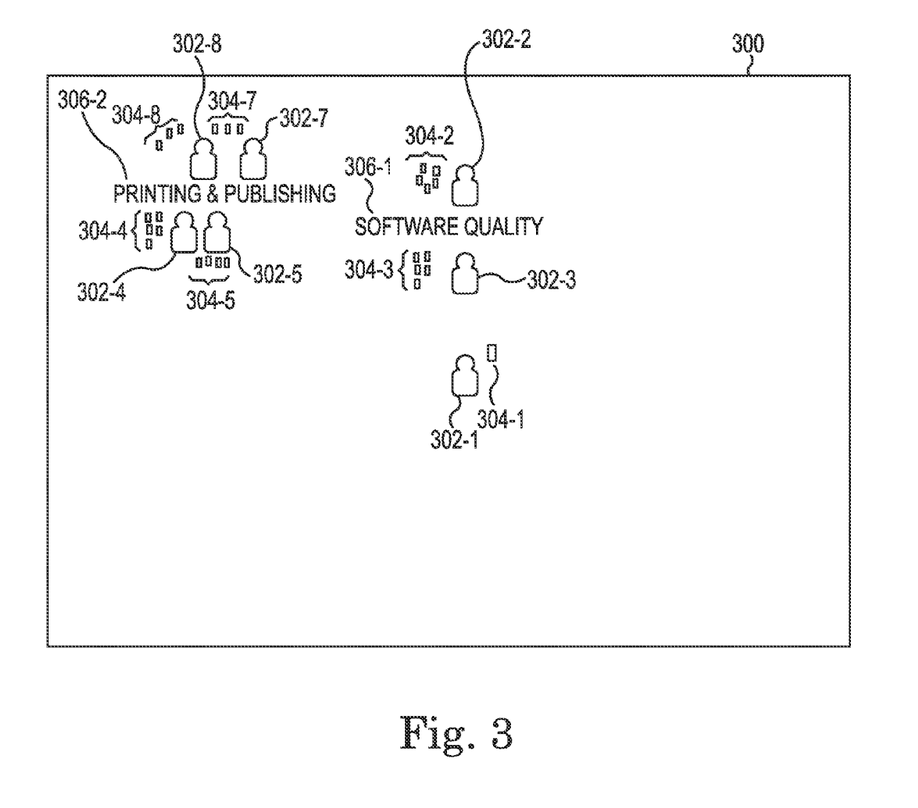
FIG. 3 is a diagram illustrating an example of decreasing the value of a weight of a node in a relevance map according to the present disclosure.
Figure 4:
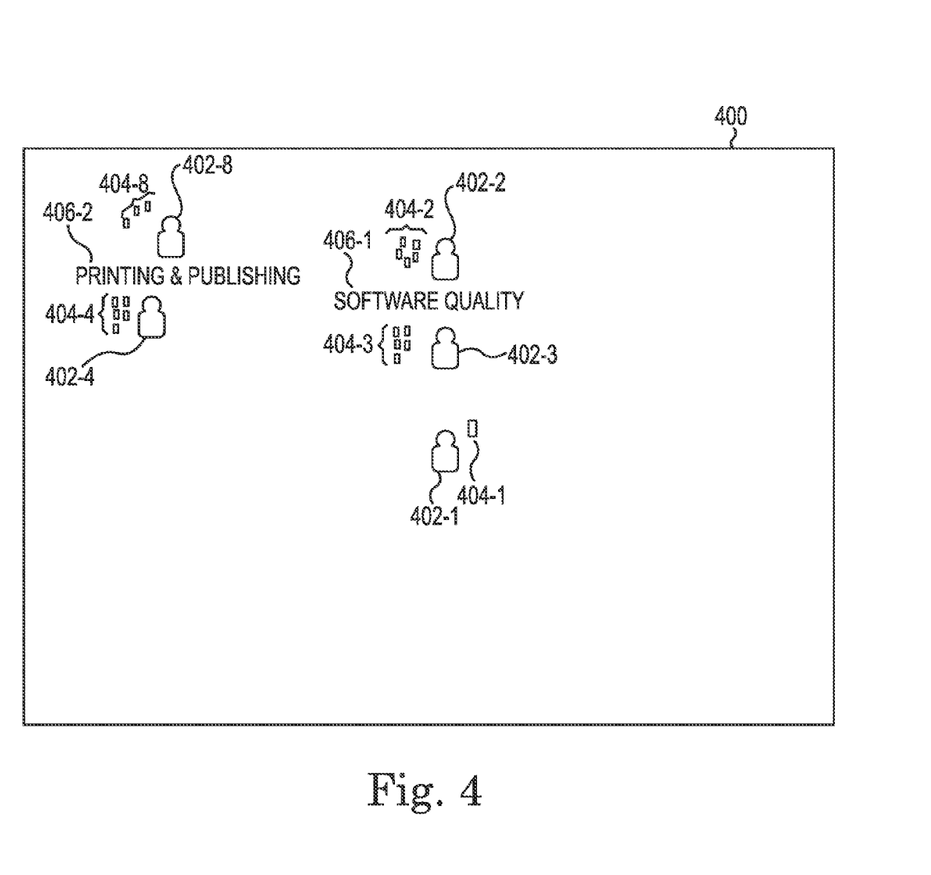
FIG. 4 is a diagram illustrating an example of decreasing the value of a weight of a node in a relevance map according to the present disclosure.

In a number of examples, the action can convey one of four different modifications of the weight. A first action can wholly decrease the value of the weight. For example, the first action can set the value of the weight equal to 0. The link between a first user node 102-1 and a different node, e.g., a second number of resource nodes 104-2, can be removed when the value of the weight is equal to 0. Removing a link between the first user node 102-1 and a different node can result in the removal of the second node form the relevance map 100. FIG. 4 shows an example of a relevance map that has had a node removed as compared to relevance map 100. A second action can decrementally decrease the value of the weight. FIG. 3 shows an example of the results of decrementally decreasing the value of a weight. A third action can incrementally increase the value of the weight. FIG. 2 shows an example of incrementally increasing the value of a weight. A fourth action can wholly increase the value of the weight. For example, the value of a weight can be set to 1.0 when the fourth action is taken by the first user node 102-1.

An edit operation can be formatted to include a value for an action and an ID of the node on which the edit operation is being implemented. For example, an edit operation can take the form of (id,action). If one of the second number of resource nodes 104-2 has an ID of 1042 and if an action to be taken is to incrementally increase the value of the weight that is associated with a link between one of the second number of resource nodes 104-2 and the first user node 102-1, then the edit operation can be formatted as (1042,0.5).

The call to implement the edit operation can be expressed as getRelevantResources(id,list <editOpperation>) wherein id can be the ID of a first user 102-1 and list <editOpperation> can be a list of edit operations. A first user node 102-1 can, for example, have an id equal to 1021 and list <editOpperation> can have a single edit operation (1042,0.5).

A new weight that is associated with a link between the first user 102-1 and one of the second number of resources 104-2 a relevance map 100 that is associated with the first user 102-1 can be calculated as follows:

$$\text{weight}_{1021}^{1042} = \text{weight}_{102t}^{1042} + \alpha \cdot \text{weight}_{1042}^{1042}.$$

In the above equation the superscript number identifies the ID of a node that is linked. The subscript identifies a node that is associated with a relevance map. That is, the subscript identifies a relevance map where the linking is occurring. For example, subscript 1021 can identify that the link exists in a relevance map that is associated with the first user node 102-1. Subscript 1042 can identify that the link exists in a relevance map (not shown) that is associated with the second number of resources 104-2. The new weight $\text{weight}_{1021}^{1042}$ can be associated with a link between the first user 102-1, e.g., ID 1021, and the second number of resources 104-2, e.g., ID 1042. The new weight can be computed by summing $\text{weight}_{1021}^{1042}$ with $\alpha \cdot \text{weight}_{1042}^{1042}$. $\text{weight}_{1021}^{1042}$ can represent a weight in a relevance map 100 that is associated with a link between the first user 102-1, e.g., ID 1021, and the second number of resources 104-2, e.g., ID 1042. $\text{weight}_{1042}^{1042}$ can represent the weight that is associated with a link between the second number of resources 104-2 and the second number of resources 104-2, e.g., itself, in a relevance map (not shown) that is associated with the second number of resources 104-2. The variable α can determine the influence of $\text{weight}_{1042}^{1042}$ can have on the new weight $\text{weight}_{1021}^{1042}$.

Each node for which a relevance map is created can have a weight assigned to itself. For example, the first user 102-1 can have a weight assigned to itself in a relevance map 100. In a number of examples, a first user 102-1 can assign itself a weight equal to 1. Assigning a weight equal to 1 to the first user 102-1 can express the highest level of relevance and/or correlation. A first user 102-1 can have the highest relevance in relevance map 100. A first user 102-1 that is assigned a low weight can have a low relevance, for example, in cases in which the first user 102-1 does not want the first number of resources to be displayed in a relevance map 100.

The variable a can be expressed as follows:

$$a = \text{action} \cdot \left(\frac{\text{weight}_{1021}^{1042}}{\text{weight}_{1042}^{1042}}\right).$$

That is, α can be equal to the action times the weight $\text{weight}_{1021}^{1042}$ that can be associated with a link between the first user 102-1, e.g., ID 1021, and the second number of resources 104-2, e.g., ID 1042, in a relevance map 100. $\text{Weight}_{1042}^{1042}$ can be a weight that is assigned to the second number of resources 104-2, e.g., ID 1042, in a relevance map (not shown) that is associated with the second number of resources 104-2. FIG. 2 represents the state of the relevance map 100 after the above mentioned edit operation has been implemented.

FIG. 2 is a diagram illustrating an example of increasing the value of a weight of a node in a relevance map according to the present disclosure. The graphical representation of relevance map 200 can include a first user 202-1 and a first number of resources 204-1 that can be analogous to a first user 102-1 and a first number of resources 104-1 in FIG. 1, respectively. The graphical representation of relevance map 200 can also include a second user 202-2 and a second number of resources 204-2 that can be analogous to a second user 102-2 and a second number of resources 104-2 in FIG. 1. Furthermore, the graphical representation of relevance map 200 can include a third user 202-3 with an associated third number of resources 204-3, a fourth user 202-4 with an associated fourth number of resources 204-4, a fifth user 202-5 with an associated fifth number of resources 204-5, a sixth user 202-6 with an associated sixth number of resources 204-6, a seventh user 202-7 with an associated seventh number of resources 204-7, and an eighth user 202-8 with an associated eighth number of resources 204-8.

The second number of resources 204-2 and the third number of resources 204-3 can be associated with a first category 106-1. The fourth number of resources 204-4, the fifth number of resources 204-5, the sixth number of resources 204-6, the seventh number of resources 204-7, and the eighth number of resources 204-8 can be associated with a second category 206-2.

The state of relevance map 200 can be the result of implementing edit operation (1042,0.5) as identified with regards to relevance map 100 in FIG. 1. The action can incrementally increase the value of a weight that is associated with a link between the second number of resources 104-2 and the first user 102-1 in FIG. 1.

In a number of examples, increasing a weight that is associated with a link between the first user 202-1 and the second number of resources 204-2 in resource map 200 can effect the relevance of the third user 202-3, the fourth user 202-4, the fifth user 202-5, the sixth user 202-6, the seventh user 202-7, the eighth user 202-8, the third number of resources 204-3, the fourth number of resources 204-4, the fifth number of resources 204-5, the sixth number of resources 204-6, the seventh number of resources 204-7, and the eighth number of resources 204-8, to the first user 202-1. That is, changing the weight that is associated with a link between the first user 202-1 and the second number of resources 204-2 can have a cascading effect such that a number of other resources, categories, and users will be relevant to the first user 202-1 because the weight that is associated with a link between the first user 202-1 and the second number of resources 204-2 increased.

For example, a link can be created between the first user 202-1 and the fifth user 202-5 and a weight can be assigned to the link when the weight that is associated with a link between the first user 102-1 and the second number of resources 104-2 is increased in FIG. 1. The fifth user 202-5 can, for example, be an author of a fifth number of resources 204-5 and a co-author of the second number of resources 204-2 such that increasing the relevance of the second number of resources 204-2 can make the fifth user 202-5 relevant to the first user 202-1.

The state of the relevance map 200 can be saved. The state of the relevance map 200 can be recreated by implementing the edit operation (1042,0.5) on the relevance map 100 in FIG. 1. Furthermore, if the relevance map 200 had been the result of a number of edit operations, then the state of the relevance map 200 could be recreated by implementing the number of edit operations.

Saving and loading a number of different states of the relevance map 200 can allow the first user 202-1 to customize a number of graphical representations of the relevance map 200 to suit the needs of the first user 202-1. For example, the first user 202-1 can have a first saved state that the first user 202-1 uses to access information that is associated with a first category 206-1 while the first user 202-1 can have a second saved state that the first user 202-1 uses to access information that is associated with a second category 206-2.

The state of the relevance map 200 can be altered with an edit operation (1025,−0.5). ID 1025 can be associated with the fifth user node 202-5. The action can include decreasing the weight that is associated with a link between the fifth user node 202-5 and the first user node 202-1. The results of the above edit operation are shown FIG. 3.

The state of the relevance map 200 can also be altered with an edit operation (1025,−1.0). ID 1025 can be associated with the fifth user node 202-5. The action in the edit operation can decrease the weight that is associated with a link between the fifth user node 202-5 and the first user node 202-1 such that the link between the fifth user node 202-5 and the first user node 202-1 is removed from the relevance map 400 in FIG. 4. The results of the edit operation are shown in FIG. 4.

FIG. 3 is a diagram illustrating an example of decreasing the value of a weight of a node in a relevance map according to the present disclosure. The graphical representation of relevance map 300 can include a first user 302-1 and a first number of resources 304-1 that can be analogous to a first user 202-1 and a first number of resources 204-1 in FIG. 2, respectively. The graphical representation of relevance map 300 can also include a second user 302-2 and a second number of resources 304-2 that can be analogous to a second user 202-2 and a second number of resources 204-2 in FIG. 2. Furthermore, the graphical representation of relevance map 300 can include a third user 302-3 with an associated third number of resources 304-3 that can be analogous to a third user 202-3 and a third number of resources 204-3 in FIG. 2, a fourth user 302-4 with an associated fourth number of resources 304-4 that can be analogous to a fourth user 202-4 and a fourth number of resources 204-4 in FIG. 2, a fifth user 302-5 with an associated fifth number of resources 304-5 that can be analogous to a fifth user 202-5 and a fifth number of resources 204-5 in FIG. 2, a seventh user 302-7 with an associated seventh number of resources 304-7 that can be analogous to a seventh user 202-7 and a seventh number of resources 204-7 in FIG. 2, and an eighth user 302-8 with an associated eighth number of resources 304-8 that can be analogous to an eighth user 202-8 and an eighth number of resources 204-8 in FIG. 2.

A sixth user 202-6 and a sixth number of resources 204-6 in FIG. 2 have been removed from relevance map 300. The sixth user 202-6 in FIG. 2 can be removed from relevance map 300 because a weight that is associated with a link between the first user 302-1 and the fifth number of resources 304-5 can be decreased as compared to a weight that is associated with a link between the first user 202-1 and the fifth number of resources 204-5 in FIG. 2. The decrease of the weight that is associated with a link between the first user 302-1 and the fifth number of resources 304-5 can have an impact on a number of weights that can be associated with a number of links between the first user 302-1 and the other nodes, e.g., a first category 306-1 and a second category 306-2, among other nodes, in relevance map 300.

FIG. 4 is a diagram illustrating an example of decreasing the value of a weight of a node in a relevance map according to the present disclosure. The graphical representation of relevance map 400 can include a first user 402-1 and a first number of resources 404-1 that can be analogous to a first user 202-1 and a first number of resources 204-1 in FIG. 2, respectively.

The graphical representation of relevance map 400 can also include a second user 402-2 and a second number of resources 404-2 that can be analogous to a second user 202-2 and a second number of resources 204-2 in FIG. 2. Furthermore, the graphical representation of relevance map 400 can include a third user 402-3 with an associated third number of resources 404-3 that can be analogous to a third user 202-3 and a third number of resources 204-3 in FIG. 2, a fourth user 402-4 with an associated fourth number of resources 404-4 that can be analogous to a fourth user 202-4 and a fourth number of resources 204-4 in FIG. 2, and an eighth user 402-8 with an associated eighth number of resources 404-8 that can be analogous to an eighth user 202-8 and an eighth number of resources 204-8 in FIG. 2.

A fifth user 202-5, a fifth number of resources 204-5, a sixth user 202-6, a sixth number of resources 204-6, and a seventh user 202-7, a seventh number of resources 204-7 in FIG. 2 have been removed from relevance map 400 because a weight that is associated with a link between the first user 402-1 and the fifth number of resources (not shown) can be decreased as compared to a weight that is associated with a link between the first user 202-1 and the fifth number of resources 204-5 in FIG. 2. The weight can be decreased such that the value is equal to 0. Decreasing the value to 0 can result in removing the link between the first user 402-1 and the fifth number of resources. Removing the link can result in removing the fifth number of resources from relevance map 400.

Removing the link between the first user 402-1 and the fifth number of resources (not shown) can have an impact on a number of weights that can be associated with a number of links between the first user 402-1 and the other nodes in relevance map 400. For example, setting the value of the weight that is associated with the link between the first user 402-1 and the fifth number of resources equal to 0 can result in decreasing the value of a weight that is associated with a link between the first user 402-1 and the fifth user (not shown) such that the fifth user can be removed from relevance map 400.

Decreasing the value of the weight that is associated with the link between the first user 402-1 and the fifth user can result in the reduction of the value of a number of weights that can be associated with a number of other nodes such that the other nodes can be removed from relevance map 400. The other nodes can include the sixth number of resources, the sixth user, the seventh number of resources, and/or the seventh user. Furthermore, decreasing the value of the weight that is associated with the link between the first user 402-1 and the fifth user can result in the reduction of the value of a number of weights that can be associated with other nodes even through the other nodes are not removed from relevance map 400. For example, the other nodes can include the first category 406-1 and/or the second category 406-2.

Figure 5:
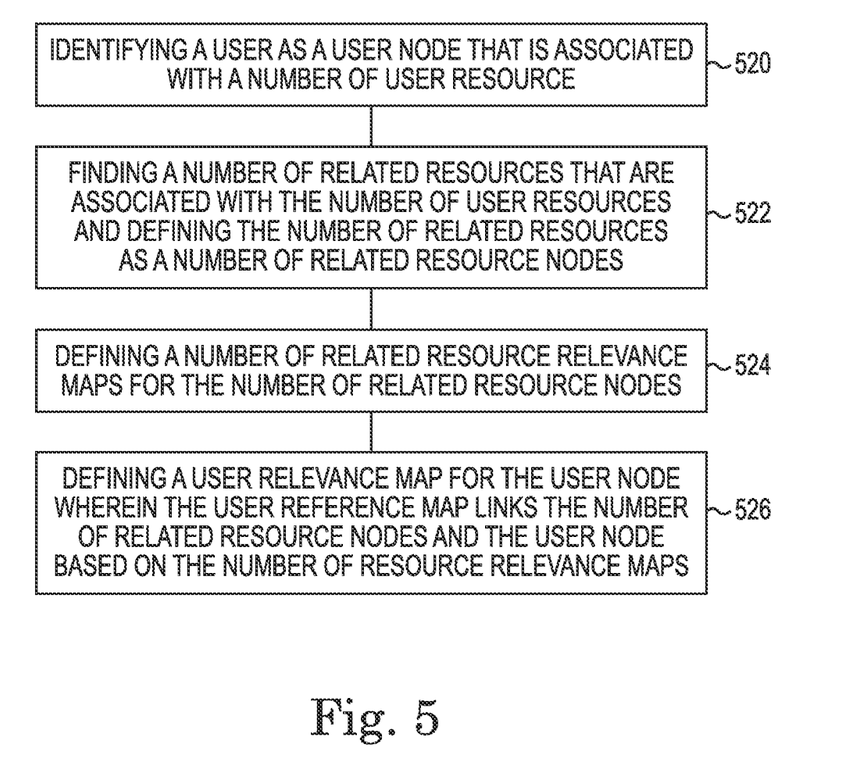
FIG. 5 is a flow chart illustrating an example of a method for relevance map linking according to the present disclosure.

FIG. 5 is a flow chart illustrating an example of a method for relevance map linking according to the present disclosure. At block 520, a user is identified as a user node that is associated with a number of user resources. A number of user resources that are closely associated with the user can be identified. A user can be closely associated with a number of user resources when the user authored the user resources, for example. A user can be closely associated with a number of user resources when the user has a personal interest in the user resources. The user can have a personal interest in the user resources if, for example, the user oversees a group of users that created the user resources. Furthermore, a user can have a personal interest in the user resources when the user and/or an enterprise identify the personal interest.

At block 522, a number of related resources that are associated with the number of user resources can be found and a number of related resources can be defined as a number of related resource nodes. A number of related resources can be resources in which the user does not have a personal interest. For example, related resources can include resources that the user can find relevant because the user is interested in the topic. The number of related resources can be associated with a user through the number of user resources and/or a number of categories. For example, if a first user resource is covered by a first category and if a first related resource is also covered by the first category, then the first related resource can be relevant to the user. The first related resource can also be relevant to a user when the first user resource and the first related resource share an author other than the user.

In a number of examples, a number of different types of nodes can be relevant to a user. For example, a category that can be relevant to a user can be represented by a category node, e.g., node with a category type, in a relevance map. A different user can be relevant to a user. The different user can be assigned a different user node. The category, the different users, and/or the relevant resources, can be relevant to a user through a number of defining characteristics that are expressed in the category, the different users, and/or the relevance resources.

At block 524, a number of related resource relevance maps can be defined for the number of related resource nodes. Each of the related resource nodes can be assigned a different relevance map. Assigning a relevance map to each related resource can provide context through which the number of related resources can be categorized as relevant. Furthermore, the relevance maps can provide context which can be used to assign a weight that identifies how relevant a related resource is to a user. The relevance maps for the related resources can link a number of resources, users, and/or categories, and can provide a number of characteristics that define the related resource such that a related resource can be relevant to a user. In a number of examples, the characteristics that define the related resources can be the links and associated weights in the relevance maps. A relevance map can be created for a number of different types of nodes. For example, a relevance map can be created for a user node, a category node, and/or a resource node.

At block 526, a user relevance map for the user node can be defined, wherein the user relevance map can link the number of related resource nodes and the user node based on the number of resource relevance maps. That is, a relevance map can be created and associated with, e.g., assigned to, a user. The relevance map can create a number of links between a user and a number of related resources, different users, and/or categories. A link to a node can express a relevance of the node to the user. A weight that can be assigned to a link can express a strength of relevance. For example, a first user can have a first link to a second user with a 0.5 weight. The first user can have a second link to a third user with a 0.7 weight. The 0.7 weight that is associated with the second link can express that the third user has a higher relevance, as compared to the 0.5 weight that is associated with the first link, to the first user than the second users.

The relevance map can be edited after the relevance map has been created for the user. A user can edit a relevance map by editing a single weight. A user can edit a relevance map by conducting a query. In a number of examples, entities other than the user can edit a relevance map that is associated with a user. For example, a second user can edit a relevance map that is associated with the first user.

A query is different than edit operation in that an edit operation identifies a node and an action that can be implemented on a weight that is associated with the node while a query provides a search criteria that can be used to identify a number of nodes. Furthermore, a query does not provide an action but rather adjusts a number of weights that are associated with a number of nodes based upon a relevance of the number of nodes to a user that implemented the query.

Implementing a query can edit a relevance map. For example, the first user can search through a number of users, categories, and/or resources, among other searchable material. The query can express a relevance of the users, categories, and/or resources that are found as a result of the search. The first user can express an increased relevance through a query and/or a decreased relevance through the query.

A query that expresses an increased relevance can be a positive query. A positive query can conduct a search over all of the users, resources, and/or categories to which an enterprise has access to. In a number of examples, a positive query can conduct a search over all of the users, resources, and/or categories in a relevance map that is associated with the first user. A positive query can include a search criteria. The result of a positive query can be used to increase the relevance of the results of the query to the first user.

The search criteria can be expressed in words, numbers, and or structures. For example, a search criteria can be expressed as the words, e.g., string, "Business Intelligence" among other search phrases. A search criteria can be expressed as a number such as 1201. A search criteria that is expressed as a number can be represented as a number and/or as a text. A search criteria can have a meaning that can be interpreted by a module conducting the query. For example, the number 1201 can represent an ID of a node. Furthermore, a search criteria can be expressed as a structure such as a node. A search criteria that is expressed as a node can search for other structures that share similar characteristics. The characteristics of a number of nodes can be compared against the search criteria to distinguish a subset of the nodes that meet the search criteria.

A number of users, categories, and/or resources can meet the search criteria. A search can be conducted over the users, categories, and/or resources and/or over associated user nodes, category nodes, and/or resource nodes. That is, a number of users, categories, and/or resources can be compared against the search criteria and/or a number of user nodes, category nodes, and/or resource nodes can be compared against the search criteria. In a number of examples, a comparison can be made before a relevance map is created for the number of user nodes, category nodes, and/or resource nodes. A comparison can also be made after a relevance map is created for the number of user nodes, category nodes, and/or resource nodes. A comparison can include comparing the relevance maps of the user nodes, category nodes, and/or resource nodes against the search criteria.

A subset of nodes that meet the search criteria can be ranked. That is, the subset of nodes that a query returns can be ranked. The ranking can be conducted based on a relevance to the user. Other criteria for a ranking can be used. The relevance can be ascertained by comparing a user's relevance map to the relevance maps created for the subset of nodes. The ranking can be comparative or real. A comparative ranking can rank the subset of nodes against each other. A real ranking can rank the subset of nodes on a scale of relevance to a user. A relevance to a user can be a weight that would exist if a link was created between the user and each of the subset of nodes.

A limitation can be placed on the rankings. For example, a user can request that only five nodes be ranked. A user can limit the ranking of nodes to those nodes that meet a specific relevance. For example, a user can limit the ranking of nodes to hose nodes that have a relevance value of 0.8 or higher in cases in which relevance is judged from 0.0 to 1.0, 1.0 being the highest relevance.

The subset of nodes that are ranked can be included in a relevance map that is associated with the user. In cases in which a ranking is not employed, the subset of nodes can be included in the relevance map. That is, a number of links can be created between the user and each of the subset of nodes and a weight can be created for each of the links.

A query that expresses a decreased relevance can be a negative query. A negative query can conduct a search over all of the users, resources, and/or categories that are included in a relevance map that is associated with a user. A negative query can also include a search criteria. The search criteria can be similar to a search criteria used in a positive query.

A negative query can search through the nodes in a relevance map that is associated with a user. The nodes that meet the search criteria can be ranked. A node can meet the search criteria through a relevance map that is created for the node and/or through other characteristics of the node. A ranking of the nodes that meet the search criteria can be created based on a relevance to a user. For example, if a first node and a second node meet the search criteria and if the first node has a relevance score of 0.5 and the second node has a relevance score of 0.75, then the first node can be less relevant to a user than the second node. In a number of examples, the ranking of the nodes can rank nodes in order of decreased relevance and/or in order of increased relevance.

A number of nodes from the ranked nodes can be selected. A number of weights that are associated with a number of links between the user and ranked nodes can be decreased. For example, the selected nodes can be removed from the relevance map that is associated with the user. That is, the links that link the user to the number of selected nodes can be removed from the relevance map. In a number of examples, the weights that are associated with the link that links the user to the number of selected nodes can be reduces. For example, a weight that is associated with a link between a user and a selected node can be decreased from a 0.75 to a 0.5.

All of the weights and associated links between a user and a number of nodes in a relevance map can be updated after a query is implemented. That is, a query can have a cascading effect on the relevance of the nodes in the relevance map that is assigned to the user.

Figure 6:
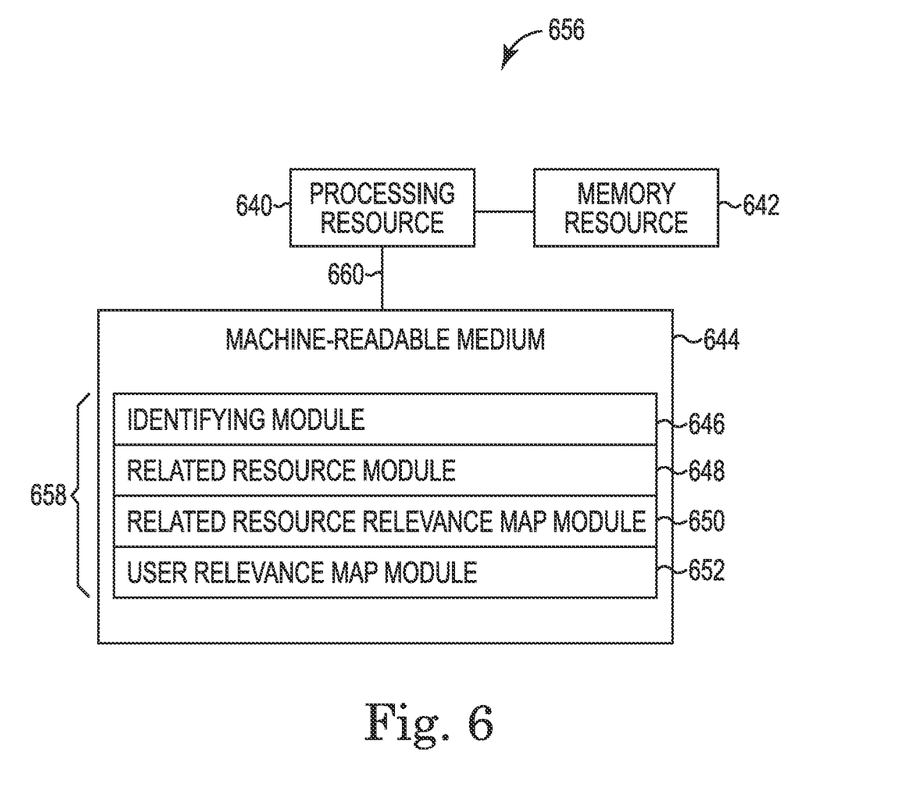
FIG. 6 illustrates an example of a computing system according to the present disclosure.

FIG. 6 illustrates an example of a computing system according to the present disclosure. The computing system 656 can utilize software, hardware, firmware, and/or logic to perform a number of functions.

The computing system 656 can be a combination of hardware and program instructions configured to perform a number of functions (e.g., actions). The hardware, for example, can include one or more processing resources 640, a machine-readable medium (MRM) 644, and other memory resources 642, etc. The program instructions, e.g., machine-readable instructions (MRI) 658, can include instructions stored on the MRM 644 to implement a particular function, e.g., an action such as customer edge device problem identification.

The processing resources 640 can be in communication with the tangible non-transitory MRM 644 storing the set of MRI 658 executable by one or more of the processing resources 640, as described herein. The MRI 658 can also be stored in a remote memory (e.g., memory 642) managed by a server and represent an installation package that can be downloaded, installed and executed. A computing device 656 (e.g., server) can include memory resources 642, and the processing resources 640 can be coupled to the memory resources 642 remotely in a cloud computing environment.

Processing resources 640 can execute MRI 658 that can be stored on internal or external non-transitory MRM 644. The processing resources 640 can execute MRI 658 to perform various functions (e.g., acts), including the functions described herein among others.

As shown in FIG. 6, the MRI 658 can be segmented into a number of modules (e.g., an identifying module 646, a related resource module 648, a related resource relevance map module 650, and a user relevance map module 652) that when executed by the processing resource 640 can perform a number of functions. As used herein a module includes a set of instructions included to perform a particular task or action. The number of modules 646, 648, 650, and 652 can be sub-modules of other modules. For example, the identifying module 646 and the related resource module 648 can be sub-modules and/or contained within a single module. Furthermore, the number of modules 646, 648, 650, and 652 can comprise individual modules separate and distinct from one another.

In the example of FIG. 6, an identifying module 646 can comprise MRI 658 that are executed by the processing resources 640 to identify a user. A number of user resources can also be identified. User resources can be associated with the user. The number of user resources can provide a context by which other resources can be determined to be relevant to the user.

A related resource module 648 can comprise MRI 658 that are executed by the processing resources 640 to find a number of related resources. The related resources can have a number of characteristics that can be similar to the characteristics of the user resources.

A related resource relevance map module 650 can comprise MRI 658 that are executed by the processing resources 640 to create a number of related resource relevance maps for the number of related resources. The related resource relevance maps can be used to determine a strength of relevance. That is, the related resource relevance maps can be used to determine how relevant the related resources are to the user.

A user relevance map module 652 can comprise MRI 658 that are executed by the processing resources 640 to create a number of links between the user and the number of related resources. A number of weights can be assigned to the links. The weights can be used to determine whether other resources that are relevant to the relevant resources can be added to the relevance map that is associated with the user.

A non-transitory MRM 644, as used herein, can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory MRM 644 can be integral or communicatively coupled to a computing device in a wired and/or wireless manner. For example, the non-transitory MRM 644 can be an internal memory, a portable memory, and a portable disk, or a memory associated with another computing resource, e.g., enabling MRIs 658 to be transferred and/or executed across a network such as the Internet.

The MRM 644 can be in communication with the processing resources 640 via a communication path 660. The communication path 660 can be local or remote to a machine, e.g., a computer, associated with the processing resources 640. Examples of a local communication path 660 can include an electronic bus internal to a machine, e.g., a computer, where the MRM 644 is one of volatile, non-volatile, fixed, and/or removable storage medium in communication with the processing resources 640 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 660 can be such that the MRM 644 is remote from a processing resource, e.g., processing resources 640, such as in a network connection between the MRM 644 and the processing resource, e.g., processing resources 640. That is, the communication path 660 can be a network connection. Examples of such a network connection can include local area network (LAN), wide area network (WAN), personal area network (PAN), and the Internet, among others. In such examples, the MRM 644 can be associated with a first computing device and the processing resources 640 can be associated with a second computing device, e.g., a Java® server. For example, processing resources 640 can be in communication with a MRM 644, wherein the MRM 644 includes a set of instructions and wherein the processing resources 640 are designed to carry out the set of instructions.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for relevance map linking comprising:
identifying a user as a user node that is associated with a number of user resources;
finding a number of related resources that are associated with the number of user resources and defining the number of related resources as a number of related resource nodes;
defining a different relevance map for each of the number of related resource nodes, wherein each of the different relevance maps defines a relevance of the number of related resource nodes to a different particular one of the number of related resource nodes;
defining a user relevance map for the user node wherein the user relevance map links the number of related resource nodes and the user node based on a number of different relevance maps and a number of weights and wherein each of the number of weights is a numerical value that is associated with a number of links between the number of related resource nodes and the user node; and
adjusting the number of weights based on an adjusted weight of a link between the user node and a first node from the related resource nodes that is adjusted in response to receipt of a user issued edit operation issued by the user of the user node.

2. The method of claim 1, wherein defining the number of different relevance maps includes:
identifying a number of related users that are associated with the number of related resources;
identifying a number of related categories that are associated with the number of related resources;
defining the number of related users as a number of related user nodes;
defining the number of related categories as a number of related category nodes; and
including the number of related user nodes and the number of related category nodes in the number of different relevance maps by linking the number of related user nodes to the number of related resource nodes and by linking the number of related category nodes to the number of related nodes.

3. The method of claim 1, wherein defining the user relevance map includes assigning the number of weights to the number of links between the related resource nodes and the user node, wherein the number of weights define a relevance of the related resource nodes to the user node.

4. The method of claim 1, wherein the method includes:
identifying a number of categories that are associated with the user and the number of user resources;
defining the number of categories as a number of category nodes; and
including the number of category nodes in the user relevance map by linking the number of category nodes to the user node.

5. The method of claim 4, wherein defining the user relevance map includes assigning the number of weights to the number of links between the number of related resource nodes and the user node based on a correlation between the number of categories and the number of related resource nodes.

6. A non-transitory machine-readable medium storing instructions for relevance map linking executable by a computer to cause the computer to:
 identify a first node in a relevance map that is associated with a user;
 receive a user issued edit operation from the user adjusting a weight that is associated with a link between a user node that represents the user and the first node wherein the weight reflects a relevance of the first node to the user;
 adjust the weight that is associated with the link between the user node and the first node by implementing the user issued edit operation;
 adjust a number of other weights that are associated with a number of other links between a number of other nodes and the user node based on an adjusted weight of the link between the user node and the first node and based on a number of different relevance maps of the first node and the number of other nodes, wherein:
  the weight and the number of other weights are numerical values that define a relevance of the first node and the number of other nodes to the user node;
  a different relevance map from the number of different relevance maps is association with the first node and each of the number of other nodes; and
  each of the different relevance maps defines the relevance of the number of other nodes to a different particular one of the number of other nodes; and
 save a state of the relevance map after the weight has been adjusted and the number of other weights have been adjusted by associating the user issued edit operation with the saved state of the relevance map.

7. The medium of claim 6, wherein the instructions executable to identify the first node include instructions executable to identify a resource, a category, or a different user that is associated with the first user.

8. The medium of claim 6, wherein the instructions executable to adjust the weight that is associated with the link between the user node and the first node by implementing the user issued edit operation include instructions executable to increase the value of the weight or decrease the value of the weight to reflect a correlation between the user node and the first node.

9. The medium of claim 8, wherein the instructions executable to decrease the value of the weight include instructions to:
 remove the link between the user node and the first node; and
 remove the first node from the relevance map.

10. The medium of claim 6, wherein the instructions are executable to:
 load a different relevance map by executing a number of saved user issued edit operations on a default relevance map; and
 associate the different relevance map with the user.

11. A system for relevance map linking, comprising:
 a processing resource in communication with a memory resource, wherein the memory resource includes a set of instructions, executable by the processing resource to:
  receive a query;
  identify a number of first nodes that meet the search criteria of the query;
  create a different relevance map for each of the number of first nodes wherein:
   the different relevance maps of the number of first nodes link the number of first nodes to a number of second nodes;
   the number of second nodes provide a context by which the number of first nodes are ranked; and
   each of the different relevance maps defines the relevance of the number of first nodes to a different particular one of the number of first nodes;
  rank the number of first nodes based on a relevance of the number of second nodes in the different relevance maps of the number of first nodes to a target user node;
  create a number of links, in a relevance map of the target user node, between the target user node and each of the number of first nodes that are ranked;
  assign a weight to each of the number of links wherein the weights represent a relevance of the number of nodes to the target user node and wherein the weights are expressed as numerical values; and
  adjust at least one of the weights in response to receipt of a user issued edit operation issued by a target user, wherein the edit operation includes a user provided value to adjust the at least one of the weights and an ID of a node to which the edit operation applies.

12. The system of claim 11, wherein the instructions are executable to rank the number of first nodes based on the relevance of the number of second nodes in the different relevance maps of the number of first nodes to the target user node include instructions executable to:
 create a different relevance map for each of the number of second nodes; and
 rank the number of first nodes and the number of second nodes based on a correlation between the different relevance maps of the number of first nodes and the relevance map of the target user node and a correlation between the different relevance maps of the number of second nodes and the relevance map of the target user node.

13. The system of claim 11, wherein the instructions are executable to create a graphical representation of the relevance map of the target user node wherein the graphical representation provides the target user with access to the number of first nodes.

14. The system of claim 11, wherein the instructions are executable to update all links and associated weights in the relevance map of the target user node based on the creation of the number of links and the associated weights.

15. The system of claim 14, wherein the instructions executable to create the number of links, in the relevance map of the target user node, between the target user node and each of the number of first nodes that are ranked include instructions to:
 determine whether the query is a positive query or a negative query;
 decrease the value of the weights that are associated with the number of links between the target user node and each of the number of first nodes if the query is determined to be the negative query; and
 increase the value of the weights that are associated with the number of links between the target user node and each of the number of first nodes if the query is determined to be the positive query.

* * * * *